United States Patent
Abukawa et al.

(10) Patent No.: US 12,416,060 B2
(45) Date of Patent: Sep. 16, 2025

(54) HIGH-STRENGTH STEEL SHEET

(71) Applicant: NIPPON STEEL CORPORATION, Tokyo (JP)

(72) Inventors: Genki Abukawa, Tokyo (JP); Hiroyuki Tanaka, Tokyo (JP); Masafumi Azuma, Tokyo (JP); Kazumasa Tsutsui, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 411 days.

(21) Appl. No.: 18/018,596

(22) PCT Filed: Sep. 10, 2021

(86) PCT No.: PCT/JP2021/033340
§ 371 (c)(1),
(2) Date: Jan. 30, 2023

(87) PCT Pub. No.: WO2022/070840
PCT Pub. Date: Apr. 7, 2022

(65) Prior Publication Data
US 2023/0295760 A1    Sep. 21, 2023

(30) Foreign Application Priority Data
Sep. 30, 2020    (JP) ................. 2020-165954

(51) Int. Cl.
| | |
|---|---|
| *C22C 38/02* | (2006.01) |
| *C21D 9/46* | (2006.01) |
| *C22C 38/00* | (2006.01) |
| *C22C 38/04* | (2006.01) |
| *C22C 38/06* | (2006.01) |
| *C23C 2/20* | (2006.01) |

(52) U.S. Cl.
CPC ............. *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C23C 2/20* (2013.01)

(58) Field of Classification Search
CPC .. C21D 1/25; C21D 9/46; C22C 38/02; C22C 38/04; C22C 38/06
See application file for complete search history.

(56) References Cited

U.S. PATENT DOCUMENTS

| | | | |
|---|---|---|---|
| 11,261,505 B2 * | 3/2022 | Nakano | B32B 15/01 |
| 2003/0094217 A1 * | 5/2003 | Yazawa | C22C 38/32 |
| | | | 148/610 |
| 2013/0167985 A1 | 7/2013 | Saito et al. | |

FOREIGN PATENT DOCUMENTS

| | | |
|---|---|---|
| JP | 2012-62558 A | 3/2012 |
| JP | 2013-133499 A | 7/2013 |

OTHER PUBLICATIONS

Takahashi, "Development of High Strength Steels for Automobiles", Nippon Steel Technical Report, 2003, No. 378, pp. 2-6.

* cited by examiner

*Primary Examiner* — Jessee R Roe
(74) *Attorney, Agent, or Firm* — Birch, Stewart, Kolasch & Birch, LLP

(57) ABSTRACT

This high-strength steel sheet contains predetermined chemical components, in a range from a surface to 1/10 of a sheet thickness in a sheet thickness direction, an average pole density of an orientation group 1 that is an orientation group expressed by $\phi 1=0°$ to $90°$, $\Phi=50°$ to $60°$ and $\phi 2=45°$ in terms of an Euler angle is 1.5 or less, an average pole density of an orientation group 2 that is an orientation group expressed by $\phi 1=450$ to $85°$, $\Phi=85°$ to $90°$ and $\phi 2=45°$ in terms of the Euler angle is 1.5 or more, an S value that indicates a degree of randomness of surface properties is 7.5 or less, an E value that indicates a degree of concentration of the surface properties is 0.04 or more, and a tensile strength is 590 MPa or more.

3 Claims, No Drawings

HIGH-STRENGTH STEEL SHEET

TECHNICAL FIELD

The present invention relates to a high-strength steel sheet.

Priority is claimed on Japanese Patent Application No. 2020-165954, filed on Sep. 30, 2020, the content of which is incorporated herein by reference.

BACKGROUND ART

In recent years, from the viewpoint of regulations for greenhouse gas emission in association with global warming countermeasures, there has been a demand for additional improvement in the fuel efficiency of vehicles. Since a majority of automobile structures are formed of iron, particularly, steel sheets, steel sheets are thinned to reduce the weights, thereby reducing the weights of vehicle bodies and improving the fuel efficiency. However, when the weight of a steel sheet is reduced simply by thinning the thickness of the steel sheet, there is a concern that the strength as a structure may decrease and the collision safety may deteriorate. Therefore, in thinning the thickness of the steel sheet, it is required to increase the mechanical strength of the steel sheet to be used so as not to decrease the strength of the structure. Therefore, recently, the application of high-strength steel sheets to components for a vehicle has been becoming more widespread in order to reduce the weights of vehicle bodies and secure collision safety.

Incidentally, for steel sheets that are used for components for vehicles, not only strength but also a variety of workability that is required at the time of forming components such as press workability and weldability are required. Specifically, from the viewpoint of press workability, bendability is required for steel sheets in many cases. However, since the formability of steel sheets tends to deteriorate with the high-strengthening of the materials, it is difficult to achieve both a high strength and favorable formability in steel sheets.

Therefore, for the application of high-strength steel sheets to components for a vehicle, it has become an important issue to realize exceptional bending workability together with a high strength of a tensile strength of 590 MPa or more.

With respect to such an issue, it has been reported in Non-Patent Document 1 that bending workability is improved by controlling the structure to a single structure of ferrite, bainite, martensite, or the like by microstructure control.

In addition, Patent Document 1 discloses a method for realizing a tensile strength of 590 MPa or more and 750 MPa or less and exceptional bending workability by controlling a steel sheet containing, by mass %, C: 0.010% to 0.055%. Si: 0.2% or less, Mn: 0.7% or less, P: 0.025% or less, S: 0.02% or less, N: 0.01% or less, Al: 0.1% or less and T: 0.06% to 0.095% to a structure including 95% or more of ferrite in terms of area ratio and controlling the diameters of carbide particles containing Ti in ferrite crystal grains and the structure to a structure in which only TiS having an average diameter of 0.5 µm or less is dispersed and precipitated as a sulfide containing Ti.

In addition, Patent Document 2 discloses a method for improving bending workability while maintaining a tensile strength of 780 MPa or more by, for a steel sheet containing, by mass %, C: 0.05% to 0.15%, Si: 0.2% to 1.2%, Mn: 1.0% to 2.0%, P: 0.04% or less. S: 0.0030% or less, Al: 0.005% to 0.10%, N: 0.01% or less, and Ti: 0.03% to 0.13%, controlling the structure inside the steel sheet to a bainite single phase or a structure including bainite in a fraction of more than 95% and setting, in the structure of the surface layer area of the steel sheet, a bainite phase to a fraction of less than 80% and ferrite that is rich in workability to a fraction of 10% or more.

CITATION LIST

Patent Document

[Patent Document 1]
Japanese Unexamined Patent Application, First Publication No. 2013-133499
[Patent Document 2]
Japanese Unexamined Patent Application, First Publication No. 2012-62558

Non Patent Document

Non Patent Document 1

Takahashi et al., Nippon Steel Engineering Co., Ltd. Technical Review "Development of High Strength Steels for Automobiles", No. 378, p. 2 to p. 6, (2003)

SUMMARY OF THE INVENTION

Problems to be Solved by the Invention

However, in recent years, the demand for strength and bending workability has been intensifying, and it cannot be said that both strength and bending workability can be sufficiently satisfied by the techniques of Patent Documents 1 and 2.

The present invention is provided in a variety of forms to be described below based on the above-described studies, and an objective of the present invention is to provide a high-strength steel sheet having a tensile strength of 590 MPa or more and exceptional bending workability.

The bending workability mentioned above refers to an index indicating how difficult a crack is initiated in a working portion during bending or an index indicating how difficult the crack grows. However, unlike the related art, in the present invention, not only cracking that occurs from the outside of a bent portion after bending but also cracking including microcracks that are initiated on the inside of the bent portion (inside bend cracking) are dealt with.

Means for Solving the Problem

The present inventors intensively investigated the bending workability of high-strength steel sheets. As a result, it was clarified that, as the strength of a steel sheet increases, cracks are more likely to be initiated not only from the outside bend but also from the inside bend during bending. That is, regarding cracking occurring during the bending of a steel sheet, in the related art, it is usual that cracks are initiated from the surface of the steel sheet or the vicinity of the end surface in the outside bend, but it was found that, in association with the high-strengthening of steel sheet, there is a case where microcracks are initiated in the inside bend (hereinafter, cracking where cracks are initiated from the outside bend will be referred to as outside bend cracking, and cracking where cracks are initiated from the inside bend will be referred to as inside bend cracking). Any methods for suppressing such outside bend cracking and inside bend cracking at the same time have not been found in the related art.

In addition, it was found from the present inventors' studies that inside bend cracking occurs in steel sheets having a tensile strength of 590 MPa or more.

As described above, in order to improve the bendability of high-strength steel sheets, there is a need to suppress outside bend cracking and inside bend cracking. The present inventors presumed that the mechanism of the initiation of the above-described outside bend cracking and inside bend cracking is attributed to the bias of deformation, paid attention to textures and surface properties and searched a method for suppressing outside bend cracking and inside bend cracking. As a result, the present inventors found that, when the texture, the degree of randomness in the surface properties and the degree of concentration of the surface properties are controlled at the same time in a steel sheet having a predetermined chemical composition, it is possible to manufacture a steel sheet having a tensile strength of 590 MPa or more while securing bendability.

The present invention has been made based on the above-described findings, and the gist of the present invention is as follows.

(1) A high-strength steel sheet according to one aspect of the present invention contains, as chemical components, by mass %, C: 0.03% to 0.28%, Si: 0.05% to 2.50%, Mn: 1.00% to 4.00%, sol. Al: 0.001% to 2.000%, P: 0.100% or less. S: 0.020% or less, N: 0.010% or less, O: 0.010% or less, Ti: 0% to 0.10%, Nb: 0% to 0.10%, B: 0% to 0.010%, V: 0% to 1.00%, Cr: 0% to 1.00%, Mo: 0% to 1.00%, Cu: 0% to 1.00%, Co: 0% to 1.00%, W: 0% to 1.00%, Ni: 0% to 1.00%, Ca: 0% to 0.010%, Mg: 0% to 0.010%, REM: 0% to 0.010%, Zr: 0% to 0.010% and a remainder: Fe and impurities, in which, in a range from a surface to 1/10 of a sheet thickness in a sheet thickness direction, an average pole density of an orientation group 1 that is an orientation group expressed by $\phi1=0°$ to $90°$, $\Phi=50°$ to $60°$ and $\phi2=45°$ in terms of an Euler angle is 1.5 or less, an average pole density of an orientation group 2 that is an orientation group expressed by $\phi1=45°$ to $85°$, $\Phi=85°$ to $90°$ and $\phi2=45°$ in terms of the Euler angle is 1.5 or more, an S value that indicates a degree of randomness of surface properties is 7.5 or less, an E value that indicates a degree of concentration of the surface properties is 0.04 or more, and a tensile strength is 590 MPa or more.

(2) The steel sheet according to (1) may include a hot-dip galvanized layer on the surface.

(3) The steel sheet according to (2), in which the hot-dip galvanized layer may be a hot-dip galvannealed layer.

Effects of the Invention

According to the above-described aspect of the present invention, it is possible to obtain a high-strength steel sheet that has a tensile strength of 590 MPa or more, is capable of suppressing outside bend cracking and inside bend cracking and has exceptional bending workability.

EMBODIMENT FOR IMPLEMENTING THE INVENTION

Hereinafter, a steel sheet according to one embodiment of the present invention will be described in detail. Here, the present invention is not limited only to a configuration disclosed in the present embodiment, and a variety of modifications can be made without departing from the scope of the gist of the present invention. In addition, numerical ranges to be described below using "to" include the lower limit value and the upper limit value in the ranges. However, numerical values expressed with "more than" or "less than" are not included in the numerical ranges. "%" regarding the amount of each element means "mass %".

1. Chemical Components

Hereinafter, the chemical components (chemical composition) of the steel sheet according to the present embodiment will be described in detail. The steel sheet according to the present embodiment contains, as the chemical components, basic elements and optional elements as necessary, and the remainder includes Fe and impurities.

(C: 0.03% to 0.28%)

C is an important element for securing the strength of the steel sheet. When the C content is less than 0.03%, it is not possible to secure a tensile strength of 590 MPa or more. Therefore, the C content is set to 0.03% or more. The C content is preferably 0.05% or more.

On the other hand, when the C content becomes more than 0.28%, the weldability becomes poor. Therefore, the C content is set to 0.28% or less. The C content is preferably 0.20% or less and more preferably 0.15% or less.

(Si: 0.05% to 2.50%)

Si is an important element capable of increasing the material strength by solid solution strengthening. When the Si content is less than 0.05%, the yield strength decreases. Therefore, the Si content is set to 0.05% or more. The Si content is preferably 0.10% or more and more preferably 0.30% or more.

On the other hand, when the Si content is more than 2.50%, the surface properties deteriorate. Therefore, the Si content is set to 2.50% or less. The Si content is preferably 2.00% or less and more preferably 1.50% or less.

(Mn: 1.00% to 4.00%)

Mn is an effective element for increasing the mechanical strength of the steel sheet. When the Mn content is less than 1.00%, it is not possible to secure a tensile strength of 590 MPa or more. Therefore, the Mn content is set to 1.00% or more. The Mn content is preferably 1.50% or more and more preferably 2.00% or more.

On the other hand, when the Mn content becomes excessive, the structure becomes uneven due to the segregation of Mn, and the bending workability deteriorates. Therefore, the Mn content is set to 4.00% or less. The Mn content is preferably 3.00% or less and more preferably 2.60% or less.

(Sol. Al: 0.001% to 2.000%)

Al is an element having an action of deoxidizing steel to make the steel sheet sound. When the sol. Al content is less than 0.001%, sol. Al is not capable of sufficiently deoxidizing steel. Therefore, the sol. Al content is set to 0.001% or more. Here, in a case where sufficient deoxidation is required, the sol. Al content is preferably 0.010% or more. The sol. Al content is more preferably 0.020% or more.

On the other hand, when the sol. Al content is more than 2.000%, the deterioration of the weldability becomes significant, the number of oxide-based inclusions increases, and the surface properties significantly degrade. Therefore, the sol. Al content is set to 2.000% or less. The sol. Al content is preferably 1.500% or less, more preferably 1.000% or less and still more preferably 0.080% or less. sol. Al means acid-soluble Al that does not turn into an oxide such as $Al_2O_3$ and is soluble in acids.

The steel sheet according to the present embodiment contains, as a chemical component, impurities. "Impurities" refer to elements that are contained by accident from ore or scrap that is a raw material or from manufacturing environments or the like at the time of industrially manufacturing steel. The impurities mean, for example, elements such as P, S, N, O, As and Sn. Among these impurities, in particular, P, S, N and O are preferably limited as described below in order to make the effect of the present embodiment sufficiently exhibited. Since the amount of the impurities is preferably small, it is not necessary to limit the lower limit, and the lower limit of the impurities may be 0%.

(P: 0.100% or Less)

P is usually an impurity that is contained in steel. When the P content is more than 0.100%, the deterioration of the weldability becomes significant. Therefore, the P content is limited to 0.100% or less. The P content is preferably limited to 0.050% or less.

Incidentally, P is also an element having an action of increasing the tensile strength. Therefore. P may be positively contained. In this case, the P content may be set to 0.001% or more in order to more reliably obtain the effect of the above-described action.

(S: 0.020% or Less)

S is an impurity that is contained in steel, and the S content is preferably as small as possible from the viewpoint of the weldability. When the S content is more than 0.020%, the weldability significantly deteriorates, the amount of MnS precipitated increases, and the low temperature toughness deteriorates. Therefore, the S content is limited to 0.020% or less. The S content is preferably 0.010% or less and more preferably 0.005% or less. The S content may be 0%; however, from the viewpoint of the desulfurization cost, the S content may be set to 0.001% or more.

(N: 0.010% or less)

N is an impurity that is contained in steel, and the N content is preferably as small as possible from the viewpoint of the weldability. When the N content is more than 0.010%, the deterioration of the weldability becomes significant. Therefore, the N content is limited to 0.010% or less. The N content is preferably 0.005% or less.

(O: 0.010% or less)

O is an impurity that is contained in steel and is an element that forms an oxide and degrades the formability. When the 0 content is more than 0.010%, the bendability significantly deteriorates, and thus the 0 content is limited to 0.010% or less. The 0 content is preferably 0.007% or less.

The steel sheet according to the present embodiment may contain Fe and impurities as the remainder in addition to the basic elements described above. However, the steel sheet may contain an optional element in addition to the basic elements, Fe and the impurities described above. For example, instead of some of Fe that is the remainder described above, one or more of Ti, Nb, B, V, Cr, Mo, Cu, Co, W, Ni, Ca, Mg, REM and Zr may be contained as optional elements. These optional elements may be contained according to the purpose. Therefore, the lower limit of these optional elements does not need to be limited and may be 0%. In addition, even when these optional elements are contained as impurities, the above-described effects are not impaired.

(Ti: 0% to 0.10%)

Ti is an element that contributes to improvement in the strength of the steel sheet by solid solution strengthening or a grain refinement effect of through crystal growth suppression. In the case of obtaining the above-described effect, the Ti content is preferably 0.001% or more. The Ti content is more preferably 0.01% or more and still more preferably 0.02% or more.

On the other hand, when the Ti content is more than 0.10%, the above-described effect is saturated and the economic efficiency deteriorates. Therefore, in a case where Ti is contained, the Ti content is set to 0.10% or less. The Ti content is preferably 0.07% or less and more preferably 0.05% or less.

(Nb: 0% to 0.10%)

Similar to Ti, Nb is an element that contributes to improvement in the strength of the steel sheet by solid solution strengthening or a grain refinement effect through crystal growth suppression. In the case of obtaining the above-described effect, the Nb content is preferably 0.001% or more. The Nb content is more preferably 0.01% or more and still more preferably 0.02% or more.

On the other hand, when the Nb content is more than 0.10%, the above-described effect is saturated and the economic efficiency deteriorates. Therefore, in a case where Nb is contained, the Nb content is set to 0.10% or less. The Nb content is preferably 0.07% or less and more preferably 0.05% or less.

In the steel sheet according to the present embodiment, at least one of T and Nb is preferably contained such that the total content reaches 0.001% or more.

On the other hand, when Ti and Nb are contained, the recrystallization of austenite during hot rolling is inhibited, a texture is likely to develop and there is a concern that the bendability may deteriorate. Therefore, the total amount of Nb and Ti is preferably 0.08% or less. That is, when the Ti content, by mass %, is indicated by [Ti] and the Nb content is indicated by [Nb], it is preferable to set [Ti]+[Nb]≤0.08.

(B: 0% to 0.010%)

B is an effective element for suppressing punched cross sections being roughened at the time of punching by being segregated in grain boundaries to improve the grain boundary strengths. In the case of obtaining the above-described effect, the B content is preferably 0.001% or more.

On the other hand, even when the B content exceeds 0.010%, the above-described effect is saturated, which becomes economically disadvantageous. Therefore, in a case where B is contained, the B content is set to 0.010% or less. The B content is preferably 0.005% or less and more preferably 0.003% or less.

(V: 0% to 1.00%)
(Cr: 0% to 1.00%)
(Mo: 0% to 1.00%)
(Cu: 0% to 1.00%)
(Co: 0% to 1.00%)
(W: 0% to 1.00%)
(Ni: 0% to 1.00%)

V, Cr, Mo, Cu, Co, W and Ni are all effective elements for stably securing the strength. Therefore, these elements may be contained singly or in combination. In the case of obtaining the effect of the above-described action, at least one of V: 0.005% or more. Cr: 0.005% or more, Mo: 0.005% or more, Cu: 0.005% or more, Co: 0.005% or more, W: 0.005% or more and Ni: 0.005% or more is preferably contained.

On the other hand, even when the content of any of the elements exceeds 1.00% in each, the effect of the above-described action is likely to be saturated, which becomes economically disadvantageous in some cases. Therefore, in a case where these elements are contained, the V content, the Cr content, the Mo content, the Cu content, the Co content, the W content and the Ni content are each preferably set to 1.00% or less.

(Ca: 0% to 0.010%)
(Mg: 0% to 0.010%)
(REM: 0% to 0.010%)
(Zr: 0% to 0.010%)

Ca, Mg, REM and Zr are all elements that contribute to the control of an inclusion, particularly, the fine dispersion of an inclusion, and have an action of enhancing the toughness. Therefore, one or more of these elements may be contained. In the case of obtaining the effect of the above-described action, the amount of at least one of these elements is preferably set to 0.0003% or more. The amount is more preferably 0.001% or more.

On the other hand, even when the content of any of the elements exceeds 0.010%, there are cases where the deterioration of the surface properties is actualized. Therefore, in a case where these elements are contained, the amount of each element is preferably set to 0.010% or less.

Here, REM refers to a total of 17 elements of Sc, Y and lanthanoids and is at least one of them. The REM content means the total amount of at least one of these elements. Industrially, lanthanoids are added in a mischmetal form.

The steel sheet according to the present embodiment preferably contains, as the chemical composition, by mass %, at least one of Ca: 0.0003% or more and 0.010% or less, Mg: 0.0003% or more and 0.010% or less, REM: 0.0003% or more and 0.010% or less, and Zr: 0.0003% or more and 0.010% or less.

The above-described chemical components may be measured by a usual steel analysis method. For example, the chemical components may be measured using inductively coupled plasma-atomic emission spectrometry (ICP-AES). C and S may be measured using a combustion-infrared absorption method, N may be measured using an inert gas melting-thermal conductivity method, and O may be measured using an inert gas fusion-nondispersive infrared absorption method.

2. Texture

Next, the texture of the steel sheet according to the present embodiment will be described.

The steel sheet according to the present embodiment has a texture in which, in a surface layer region that is a range from the surface to $1/10$ of the sheet thickness in the sheet thickness direction, the average pole density of an orientation group 1 ($\phi1=0°$ to $90°$, $\Phi=50°$ to $60°$ and $\phi2=45°$ in terms of the Euler angle) becomes 1.5 or less, and the average pole density of an orientation group 2 ($\phi1=45°$ to $85°$, $\Phi=85°$ to $90°$ and $\phi2=45°$ in terms of the Euler angle) becomes 1.5 or more.

The responsiveness of a slip system against distortion at the time of adding the distortion to the steel sheet varies with each crystal orientation (Schmid factor). This can be considered that deformation resistance varies with each crystal orientation.

When the texture is relatively random, the deformation resistance is also uniform, and thus distortion is likely to occur uniformly; however, when a specific texture develops, bias of deformation is likely to be caused between crystals having an orientation with large deformation resistance and crystals having the other orientations. Conversely, when crystals having an orientation with large deformation resistance are reduced, distortion is likely to be caused uniformly. That is, due to these facts, the present inventors paid attention to the texture and found that outside bend cracking and inside bend cracking can be suppressed by controlling the texture particularly in the surface layer region in the sheet thickness direction where cracks are initiated.

(Surface Layer Region: Region from Surface to $1/10$ of Sheet Thickness in Sheet Thickness Direction)

At the time of bending the steel sheet, strain becomes larger toward the surface with the center of the sheet thickness as the boundary, and the strain is maximized on the outermost surface. Therefore, cracks during outside bend cracking and inside bend cracking are initiated on the surface of the steel sheet. What contributes to the initiation of such cracks is the structure in a range from the surface to a $1/10$ position of the sheet thickness. Therefore, in the present embodiment, the above-described range is regarded as the surface layer region, and the texture of this surface layer region is controlled as described below.

<Average Pole Density of Orientation Group 1 (Orientation Group Expressed by $\phi1=0°$ to $90°$, $\phi=50°$ to $60°$ and $\phi2=45°$ in Term of Euler Angle: 1.5 or Less>

Orientations that are included in this orientation group are referred to as γ fibers and are orientations that develop mainly in cold-rolled steel sheets. The deformation resistance of a crystal having an orientation that is included in the orientation group 1 is particularly large at the time of bending. Therefore, due to the difference in deformation resistance between crystals having any orientation included in the orientation group 1 and crystals having the other orientations, bias of deformation is likely to be caused. Therefore, outside bend cracking and inside bend cracking can be suppressed by decreasing the pole density of the crystal orientation group 1. When the average pole density of the orientation group 1 (an orientation group expressed by $\phi1=0°$ to $90°$, $\Phi=50°$ to $60'$ and $\phi2=45°$ in terms of the Euler angle) is more than 1.5, outside bend cracking or inside bend cracking is caused. In this case, R/t, which is a value obtained by dividing the average value of the minimum bend radii of L-axis bending and C-axis bending by the sheet thickness, does not become 2.0 or less. Therefore, the average pole density of the orientation group 1 is set to 1.5 or less.

<Average Pole Density of Orientation Group 2 (Orientation Group Expressed by $\phi1=45°$ to $85°$, $\phi=85°$ to $90°$ and $\phi2=45°$) in Term of Euler Angle: 1.5 or More>

Orientations that are included in this orientation group are orientations that develop due to hot rolling carried out under predetermined conditions. The deformation resistance of a crystal having an orientation that is included in the orientation group 2 is relatively small at the time of bending. Therefore, when orientations that are included in the orientation group 2 are developed, bias of deformation during bending is less likely to be caused. Therefore, outside bend cracking and inside bend cracking can be suppressed by increasing the pole density of the crystal orientation group 2. When the average pole density of the orientation group 2 (an orientation group expressed by $\phi1=45°$ to $85°$, $\Phi=85°$ to $90°$ and $\phi2=45°$ in terms of the Euler angle) is less than 1.5, outside bend cracking or inside bend cracking is caused. In this case, R/t, which is a value obtained by dividing the average value of the minimum bend radii of L-axis bending and C-axis bending by the sheet thickness, does not become 2.0 or less. Therefore, the average pole density of the orientation group 2 is set to 1.5 or more.

The pole density can be measured by an electron backscatter diffraction pattern (EBSP) method.

Specifically, a sample to be subjected to analysis by the EBSP method is collected such that a cut surface parallel to the rolling direction and perpendicular to the sheet surface becomes a measurement surface, the measurement surface of this sample is mechanically polished, and then strain is removed by chemical polishing, electrolytic polishing, or the like. Analysis is carried out using this sample by the EBSP method in a manner that, in the range from the surface of the steel sheet to $1/10$ of the sheet thickness, the measurement intervals are set to 4 μm and the measurement area becomes 150000 μm² or more. The obtained crystal orientation information is BUNGE-expressed, and the average pole densities of the orientation group 1 and the orientation group 2 are calculated with the crystal orientation distribution function (ODF) of a cross section with #2=45°.

3. Surface Properties

<S Value Indicating Degree of Randomness of Surface Properties being 7.5 or Less and E Value Indicating Degree of Concentration of Surface Properties being 0.04 or More>

The present inventors investigated the relationship between the state of the surface and bias of deformation in order to further improve the bending properties. As a result, it was found that the occurrence of bias of deformation or the outside bend cracking property and the inside bend cracking property as a result of the bias cannot be sufficiently organized with the arithmetic average roughness of the surface, which has been often discussed in the related art regarding the relationship with bendability.

Therefore, the present inventors searched for a parameter of the surface properties enabling the organization of the outside bend cracking property and the inside bend cracking property. As a result, it was newly found that the use of two parameters of an S value that indicates the degree of randomness of the surface properties and an E value that indicates the degree of concentration of the surface properties makes it possible to organize the outside bend cracking property and the inside bend cracking property and outside bend cracking and inside bend cracking can be suppressed by setting those parameters in specific ranges.

Specifically, it was found that, in a case where the S value, which indicates the degree of randomness of the surface properties, is 7.5 or less and the E value, which indicates the degree of concentration of the surface properties, is 0.04 or more, outside bend cracking and inside bend cracking can be suppressed.

Therefore, in the steel sheet according to the present embodiment, the S value, which indicates the degree of randomness of the surface properties, is set to 7.5 or less, and the E value, which indicates the degree of concentration of the surface properties, is set to 0.04 or more. It is preferable that the S value is 6.5 or less and the E value is 0.05 or more.

In addition, the lower limit of the S value does not need to be limited, but S value may be set to 5.0 or more. The upper limit of the E value does not need to be limited, but E value may be set to 0.10 or less.

The degrees of randomness and concentration of the surface properties can be measured using a three-dimensional measuring instrument in which a laser is used (for example, Point autofocus probe 3D form measuring instrument MLP-3 manufactured by Mitaka Kohki Co., Ltd.).

Specifically, a 1000 µm-long profile of the surface unevenness is obtained under conditions where the laser diameter is set to 1 µm and the measurement pitches are set to 2 µm. The slope of the obtained profile of the surface unevenness is corrected by the least-square method in the full length of the measurement range, and the following mathematical treatment is carried out on the profile, the undulation of which has been corrected with a cut-off value of 0.8 µm, (profile for analysis), thereby calculating the S value, which indicates the degree of randomness of the surface properties, and the E value, which indicates the degree of concentration of the surface properties.

That is, the obtained profile for analysis is converted to discrete signals having a total of 256 gradations of 0 to 255 with the upper and lower limits set to ±20 µm. Next, a 256×256 matrix Pin which all components are zero is prepared. Furthermore, corresponding frequency values are stored in the $(i, j\_k)$ $(k=1, \ldots, 25)$ components of the matrix P with reference to the depth values $j\_k$ of 25 adjacent pitches scattered with respect to a depth value i where each measurement point is scattered. The above-described procedure is repeated for all measurement points. Furthermore, with respect to the matrix P in which the frequency values of all of the measurement points have been stored, a matrix Q standardized such that the total of all components becomes one is produced. The S value and the E value are calculated by the following equations (1) and (2) using the matrix Q.

In the present embodiment, the average values of the S values and the E values obtained by measurement carried out parallel to and perpendicular to the rolling direction on both surfaces of the steel sheet are regarded as the representative S value and E value of the material, respectively.

$$S = -\Sigma\_\{i=0, \ldots, 255, j=0, \ldots 255\} Q\_\{i,j\} \log Q\_\{i,j\} \quad (1)$$

$$E = \sqrt{\Sigma\_(\{i=0, \ldots, 255, j=0, \ldots 255\} Q\_\{i,j\})} \quad (2)$$

Here, $Q\_\{i, j\}$ in the equations (1) and (2) indicates the (i, j) component in the matrix Q.

4. Mechanical Properties

<Tensile Strength: 590 MPa or More>

The steel sheet according to the present embodiment has, as a sufficient strength that contributes to the weight reduction of vehicles, a tensile strength (TS) of 590 MPa or more. On the other hand, it is not necessary to particularly specify the upper limit of the tensile strength, but it is difficult to obtain a tensile strength of more than 1470 MPa with the configuration of the present embodiment, and thus the substantial tensile strength is 1470 MPa or less.

The tensile strength can be measured by carrying out a tensile test according to JIS Z 2241 (2011).

<Limit Bend R/t: 2.0 or Less>

In the steel sheet according to the present embodiment, the limit bend R/t value, which serves as an index value of the outside bend cracking property and the inside bend cracking property, is preferably 2.0 or less.

The R/t value is obtained as follows: for example, a strip-shaped test piece is cut out from a ½ position in the width direction of the steel sheet, the test piece is bent according to JIS Z 2248 (2014) (V block 90° bending test) to form a bend where the bend ridge is parallel to the rolling direction (L direction) (L-axis bend) and a bend where the bend ridge is parallel to a direction orthogonal to the rolling direction (C direction) (C-axis bend), and the minimum bend radius at which a crack having a length of 30 µm or more is not initiated in the outside bend and the inside bend of each of the L-axis bend and the C-axis bend is obtained. A value obtained by dividing the average value (R) of the minimum bend radii along the L axis and the C axis by the sheet thickness (t) is regarded as the limit bend R/t and used as an index value of the bendability.

5. Microstructure

As long as the steel sheet according to the present embodiment has a texture and surface properties in the above-described ranges and has a tensile strength of 590 MPa or more, the configuration phases of the structure are not limited.

The structure may have any phase of ferrite (α), pearlite (P), bainite (B), fresh martensite (FM) and tempered martensite (t-M), residual austenite (retained γ) and the like. For example, the structure may include, by area %, 80% or less of ferrite, 0% to 100% of one or two of bainite and tempered martensite, 20.0% or less of fresh martensite, additionally, 25.0% or less of residual austenite and 5.0% or less of pearlite. When the fraction of ferrite is high, the tensile strength decreases, and thus it is desirable that ferrite is 70 area % or less if the tensile strength is 780 MPa or more and ferrite is 60 area % or less if the tensile strength is 980 MPa or more.

In a case where the area ratio of each structure is measured, the following method can be used.

A sample is collected such that a sheet thickness cross section parallel to the rolling direction of the steel sheet serves as an observed section, the observed section is polished and Nital-etched, 10 visual fields in a range of ⅛ to ⅜ of the sheet thickness (⅛ thickness to ⅜ thickness) from the surface in which the position of a ¼ depth of the steel thickness (¼ thickness) from the surface is centered are observed using a field emission scanning electron microscope (FE-SEM) at a magnification of 5000 times, the area ratios of each structure obtained in the individual visual fields are averaged, and the average value is regarded as the volume percentage of each structure. At the time of the observation, image analysis is carried out based on the brightness difference or the difference in the form of an iron carbide present in the phases, which makes it possible to identify ferrite, pearlite, bainite and tempered martensite.

In addition, the volume percentage of the residual austenite can be obtained by X-ray diffraction, and the volume percentage of the fresh martensite can be obtained as a difference between the volume percentage obtained as the area ratio of a non-corroded region that is observed with the FE-SEM and the volume percentage of the residual austenite measured by X-ray diffraction.

The sheet thickness ($t_f$) of the steel sheet according to the present embodiment is not limited and may be set to approximately 0.8 to 4.0 mm on the assumption of application to components for a vehicle.

The steel sheet according to the present embodiment may further include hot-dip galvanizing layer on the surface. In addition, the hot-dip galvanizing layer may be hot-dip galvannealing layer on which an alloying treatment has been performed.

Since galvanizing contributes to improvement in corrosion resistance, in the case of being applied to uses where corrosion resistance is expected, the steel sheet is desirably a hot-dip galvanized steel sheet or a galvannealed steel sheet on which galvanizing has been performed.

Since there is a concern that suspension components of vehicles may be perforated by corrosion, there is a case where it is not possible to thin the steel sheet to a certain sheet thickness or less even after high-strengthening. Since one of the purposes of the high-strengthening of the steel sheet is weight reduction by thinning, even when a high-strength steel sheet is developed, if the corrosion resistance is poor, regions to which the high-strength steel sheet can be applied are limited. As a method for solving this problem, it is conceivable to perform plating such as highly corrosion-resistant hot-dip galvanizing on the steel sheet. In the steel sheet according to the present embodiment, the chemical components are controlled as described above, and thus hot-dip galvanizing is possible.

The plating may be electrogalvanizing or may be plating containing Si, Al and/or Mg in addition to Zn.

6. Manufacturing Method

Next, a preferable method for manufacturing the steel sheet according to the present embodiment will be described.

The method for manufacturing the steel sheet of the present invention, which will be exemplified below, preferably includes the following steps (I) to (V).

(I) A heating step of heating a cast slab,
(II) A hot rolling step of carrying out rough rolling and finish rolling on the heated slab to produce a hot-rolled steel sheet,
(III) A coiling step of coiling the hot-rolled steel sheet after the finish rolling,
(IV) A pickling step of pickling the hot-rolled steel sheet after the coiling step, and
(V) A rolling step of rolling the hot-rolled steel sheet after the pickling step in a temperature range of 50° C. to 100° C. at a rolling reduction of 1% to 20%.

Hereinafter, preferable conditions and the like of each step will be described. Regarding steps and conditions that will not be particularly described, well-known conditions can be adopted.

Manufacturing steps preceding the heating step (heating for hot rolling) are not particularly limited. That is, subsequent to melting with a blast furnace, an electric furnace, or the like, a variety of secondary smelting is carried out, and then casting needs to be carried out by a method such as ordinary continuous casting, casting by an ingot method, or thin slab casting. In the case of the continuous casting, the cast slab may be hot-rolled after being once cooled to a low temperature and then heated again or the cast slab may be hot-rolled as it is after being cast without being cooled to a low temperature. Scrap may be used as a raw material.

(Heating step)

In the heating step, the cast slab is heated for the hot rolling step that is subsequently carried out.

In this heating step, the slab is heated to a temperature of 1100° C. or higher and then retained for 30 minutes or longer. When the heating temperature is lower than 1100° C. or the retention time is shorter than 30 minutes, a compound that is contained in steel is not sufficiently melted, and the bendability deteriorates.

On the other hand, the upper limit of the heating temperature is not limited; however, when the heating temperature is higher than 1350° C., the amount of scale generated increases, and the yield decreases. Therefore, the heating temperature is preferably set to 1350° C. or lower. In addition, the upper limit of the heating time is not limited; however, in order to suppress an excessive scale loss, the heating retention time is preferably set to 10 hours or shorter and more preferably set to five hours or shorter.

(Hot Rolling Step)

In the hot rolling step, the heated slab is rough-rolled and finish-rolled to produce a hot-rolled steel sheet.

The heated slab is first rough-rolled to become a rough rolled sheet.

The rough rolling is carried out until the sheet thickness falls into a range of more than 35 mm and 45 mm or less. When the sheet thickness after the end of the rough rolling (the sheet thickness at the time of beginning the finish rolling) is 35 mm or less or more than 45 mm, a texture by the finish rolling cannot be sufficiently controlled, and, in the end, it is not possible to obtain a texture in which the average pole density of the orientation group 1 is 1.5 or less and the average pole density of the orientation group 2 is 1.5 or more.

Next, finish rolling is carried out on the steel sheet after the rough rolling (rough-rolled sheet).

The finish rolling is carried out such that the beginning temperature is 1100° C. or higher, the rolling reduction $F_1$ at one pass before the final pass of multi-pass finish rolling is larger than 11% and 23% or smaller, the rolling reduction $F_2$ of the final pass is larger than 11% and 22% or smaller and, furthermore, the rolling temperature FT at the final pass is 930° C. or higher.

When the beginning temperature of the finish rolling is lower than 1100° C., austenite recrystallization during hot rolling is suppressed, and a texture with a specific orientation develops in the hot-rolled steel sheet. In this case, it is difficult to obtain a texture in which the average pole density of the orientation group 1 is 1.5 or less and the average pole density of the orientation group 2 is 1.5 or more in the end. In addition, when the beginning temperature of the finish rolling is lower than 1100° C., the descaling property on the finish entry side deteriorates, the surface properties of the hot-rolled steel sheet are not sufficiently controlled, and the control of the final surface properties (the degree of randomness and the degree of concentration) becomes difficult. Therefore, the beginning temperature of the finish rolling is set to 1100° C. or higher.

When the rolling reductions of the two final passes in the multi-pass finish rolling are all 11% or less, austenite recrystallization is suppressed, and a texture with a specific orientation develops in the hot-rolled steel sheet. In this case, it becomes difficult to obtain a texture in which the average pole density of the orientation group 1 is 1.5 or less and the average pole density of the orientation group 2 is 1.5 or more in the end. Therefore, the rolling reductions of the two final passes in the multi-pass finish rolling are all set to more than 11%. On the other hand, when the rolling reduction $F_1$ at one pass before the final pass is more than 23%, lattice defects in the crystals become excessive, and the recrystallization behaviors change, and thus it is not possible to control the texture in the surface layer region within the above-described range. In addition, when the rolling reduction $F_2$ of the final pass is more than 22%, lattice defects in the crystals become excessive, and the recrystallization behaviors change, and thus it is not possible to control the texture in the surface layer region within the above-described range.

In addition, when the rolling temperature FT at the final pass is lower than 930° C., austenite recrystallization is suppressed, and a texture with a specific orientation develops in the hot-rolled steel sheet. In this case, it becomes difficult to obtain a texture in which the average pole density of the orientation group 1 is 1.5 or less and the average pole density of the orientation group 2 is 1.5 or more in the end. Therefore, the rolling temperature FT at the final pass in the multi-pass finish rolling is set to 930° C. or higher.

(Coiling Step)

In the coiling step, the hot-rolled steel sheet after the finish rolling is coiled at a coiling temperature of 650° C. or lower. When the coiling temperature is higher than 650° C., an internal oxidation layer is formed after the hot-rolled steel sheet is coiled into a coil, and the pickling property deteriorates.

The lower limit of the coiling temperature is not limited; however, when the coiling temperature is low, the strength of the hot-rolled steel sheet increases, and the rolling properties in post steps deteriorate. Therefore, the coiling temperature may be set to 250° C. or higher.

(Pickling Step)

The hot-rolled steel sheet after the coiling step is uncoiled as necessary and then pickled to remove scale. A pickling needs to be carried out with, for example, hydrochloric acid having a concentration of 3% to 10% at a temperature of 85° C. to 98° C., to which an inhibitor has been added, for 20 seconds to 100 seconds.

(Rolling Step)

The hot-rolled steel sheet after the pickling step is rolled only one pass at a temperature of 50° C. to 100° C. with one rolling roll under a condition where the rolling reduction becomes 1.0% or larger and 20.0% or smaller within 300 seconds after the completion of the pickling step. When the rolling is carried out more than one pass, a texture by the rolling develops, and it is not possible to obtain a texture in which the average pole density of the orientation group 1 is 1.5 or less and the average pole density of the orientation group 2 is 1.5 or more.

In addition, in order to obtain the specified surface properties, the hot-rolled steel sheet needs to be rolled in a state of having small deformation resistance to rolling and thus needs to be rolled at 50° C. or higher. When the rolling temperature is lower than 50° C., it is not possible to obtain surface properties that satisfy the S value, which indicates the degree of randomness of the surface properties, of 7.5 or less and the E value, which indicates the degree of concentration of the surface properties, of 0.04 or more. On the other hand, when the rolling temperature is higher than 100° C., a texture by the rolling develops, and it is not possible to obtain a texture in which the average pole density of the orientation group 1 is 1.5 or less and the average pole density of the orientation group 2 is 1.5 or more.

In addition, when the rolling reduction is smaller than 1.0%, the surface properties cannot be sufficiently controlled, and it is not possible to obtain surface properties that satisfy the S value, which indicates the degree of randomness of the surface properties, of 7.5 or less and the E value, which indicates the degree of concentration of the surface properties, of 0.04 or more. On the other hand, when rolling is performed at a rolling reduction of larger than 20.0%, a texture by the rolling develops, and it is not possible to obtain a texture in which the average pole density of the orientation group 1 is 1.5 or less and the average pole density of the orientation group 2 is 1.5 or more.

In addition, in order to obtain the specified surface properties, it is necessary to carry out the rolling before a surface oxide is formed again after the pickling. Therefore, the rolling is carried out within 300 seconds after the pickling. When the time taken from the pickling to the rolling is longer than 300 seconds, the surface properties cannot be sufficiently controlled, and it is not possible to obtain surface properties that satisfy the S value, which indicates the degree of randomness of the surface properties, of 7.5 or less and the E value, which indicates the degree of concentration of the surface properties, of 0.04 or more.

In the related art, there was a case where temper rolling was carried out on hot-rolled steel sheets or cold-rolled steel sheets. However, the main purpose of so-called normal temper rolling is to prevent the appearance of a yield point elongation in a stress-strain curve, that is, to prevent the generation of "wrinkles" called stretcher strain during the working of steel sheets, temper rolling is carried out at normal temperature, which is a low temperature of lower than 50° C., at a small rolling reduction and, consequently, the same texture or surface properties of the steel sheet according to the present embodiment cannot be obtained.

(Thermal Treatment Step)

A thermal treatment may be carried as follows: the hot-rolled steel sheet after the rolling step is heated to a temperature range of 750° C. to 900° C., retained in the temperature range for 10 seconds to 1000 seconds and then cooled in a range of 750° C. to 600° C. at an average cooling rate of 1.0° C./seconds or faster. According to this thermal treatment, it is possible to transform some or all ferrite into austenite during the heating or the retention and then transform some or all of the austenite into a low-temperature transformation structure such as bainite or martensite. In a case where the microstructure includes the low-temperature transformation structure, a high strength can be obtained.

When the thermal treatment temperature is lower than 750° C. and the retention time is shorter than 10 seconds, the proportion of ferrite that transforms into austenite is not sufficient, and it is difficult to obtain a tensile strength of 590 MPa or more.

On the other hand, when the thermal treatment temperature is higher than 900° C., crystal grains coarsen, and the toughness deteriorates.

In addition, even when the retention time becomes longer than 1000 seconds, the progress of the transformation is saturated. Therefore, in consideration of the purpose of controlling the phase fraction of austenite, the hot-rolled steel sheet does not need to be heated for longer than 1000 seconds, and the substantial upper limit is set to 1000 seconds from the viewpoint of industrial efficiency.

At temperatures of 750° C. to 600° C., ferritic transformation is likely to occur, and, when the hot-rolled steel sheet is retained in this temperature range for a long time, it becomes difficult to secure a tensile strength of 590 MPa or more. Therefore, the hot-rolled steel sheet is cooled in a temperature range of 750° C. to 600° C. at an average cooling rate of 1.0° C./seconds or faster.

The thermal treatment causes BCC-FCC transformation, and the subsequent cooling causes FCC-BCC transformation, but both transformations occur in a certain crystal orientation relationship, and thus the tendency of the texture that the hot-rolled steel sheet had before the thermal treatment is maintained even after the thermal treatment. Therefore, in a case where the texture before the thermal treatment is controlled by the hot rolling method or rolling method exemplified above, it is possible to obtain a specific texture, that is, a texture in which the average pole density of the orientation group 1 is 1.5 or less and the average pole density of the orientation group 2 is 1.5 or more after the thermal treatment. In addition, in the thermal treatment in this temperature range, since the surface properties do not change significantly, in a case where the surface properties before the thermal treatment are controlled by the hot rolling method or rolling method exemplified above, it is possible to obtain specific surface properties, that is, surface properties that satisfy the S value, which indicates the degree of randomness, of 7.5 or less and the E value, which indicates the degree of concentration of the surface properties, of 0.04 or more after the thermal treatment.

In addition, after the thermal treatment step, the hot-rolled steel sheet may be retained at 600° C. or lower for 10 seconds to 1000 seconds for the purpose of building the final structure. In this temperature range, a retention temperature may be a constant or the retention temperature may be changed by heating and cooling the hot-rolled steel sheet. The hot-rolled steel sheet may be retained in the cooling process of the thermal treatment or the hot-rolled steel sheet may be once cooled to room temperature, then, reheated by a separate step and retained. For the purpose of temperature control, for example, residual austenite is stabilized by progressing bainitic transformation, the local distortion capability is improved by tempering martensite or the like. In the case of carrying out plating, a method to be described below is desirable.

(Plating Step)

In a case where the steel sheet according to the present embodiment is made into a hot-dip galvanized steel sheet or galvannealed steel sheet for the purpose of improving the corrosion resistance, it is preferable to perform hot-dip galvanizing on the hot-rolled steel sheet after the heat treatment step. Since galvanizing contributes to improvement in corrosion resistance, in the case of applying the steel sheet to uses where corrosion resistance is expected, galvanizing is desirably carried out. The galvanizing is preferably hot-dip galvanizing. The conditions of the hot-dip galvanizing are not particularly limited, and the hot-dip galvanizing may be carried out under well-known conditions.

In addition, the hot-rolled steel sheet after the hot-dip galvanizing (hot-dip galvanized steel sheet) is alloyed, whereby a galvannealed steel sheet can be manufactured. The galvannealed steel sheet is capable of imparting an effect such as improvement in spot weldability or improvement in sliding ability during drawing in addition to improvement in the corrosion resistance and thus may be alloyed depending on uses.

The above-described hot-dip galvanizing treatment and hot-dip galvannealing treatment may be carried out after the steel sheet is once cooled to room temperature after the heat treatment or may be carried out without being cooled.

Even when Al plating, plating containing Mg or electroplating is carried out in addition to the galvanizing, the steel sheet according to the present embodiment can be manufactured.

Examples

The steel sheet of the present invention will be described more specifically with reference to examples. Here, the following examples are examples of the steel sheet of the present invention, and the steel sheet of the present invention is not limited to the aspects of the following examples.

Steels having a chemical composition shown in Table 1 were cast, after casting, reheated as they were or after being once cooled to room temperature, heated at slab heating temperatures shown in Table 2-1 for one hour or longer and rough-rolled to sheet thicknesses of the rough-rolled sheets shown in Table 2-1. Next, finish rolling was begun at finish rolling start temperatures shown in Table 2-1, and the finish rolling was carried out such that the rolling reductions $F_2$ (%) of the final passes in multi-pass finish rolling, the rolling reductions $F_1$ (%) of the passes before the final pass and, furthermore, the rolling temperatures FT (° C.) of the final passes became conditions shown in Table 2-1, respectively. Subsequently, the steel sheets were cooled to coiling temperatures shown in Table 2-1 at average cooling rates of 20° C./seconds to 80° C./seconds from the rolling temperatures of the final passes to the coiling temperatures and coiled. In a pickling step, the steel sheets were pickled for 20 seconds to 100 seconds with hydrochloric acid having a concentration (mass %) shown in Table 2-2 at temperatures of 85° C. to 98° C., to which an inhibitor had been added, to remove scale.

In a rolling step after the pickling step, rolling was carried out under conditions where the temperatures, the numbers of rolling machines, the number of passes, the rolling reductions and the elapsed times from the completion of the pickling of Table 2-2 were shown.

In a thermal treatment step after the rolling step, the steel sheets were retained at heating temperatures for heating times shown in Table 2-2 as conditions and then thermally treated in a pattern to be described below for the purpose of including tempered martensite (t-M), bainite including retained γ (TRIP) and ferrite/martensite (DP) in the structures.

(Tempered Martensite Pattern: t-M)

The steel sheets were cooled from the heating temperatures to 700° C. at 20° C./second, then, cooled from 700° C. to 150° C. or lower at 100° C./second, reheated to 250° C. at 20° C./second and retained at 250° C. for 300 seconds.

(Retained γ-Including Bainite Pattern: TRIP)

The steel sheets were cooled from the heating temperatures to 700° C. at 20° C./second, then, cooled from 700° C. to 250° C. or lower at 100° C./second, reheated up to 400° C. at 520° C./second and retained at 400° C. for 300 seconds.

(Ferrite/Martensite Pattern: DP)

The steel sheets were cooled from the heating temperatures to 600° C. at 15° C./second, then, cooled from 700° C. to 250° C. or lower at 100° C./second and retained at 250° C. for 300 seconds.

From the obtained steel sheets, the microstructures were observed, and the textures, the surface properties and the mechanical properties (tensile strengths and limit bends) were obtained.

The fractions of the microstructures were obtained by the above-described method. That is, a sample was collected such that a sheet thickness cross section parallel to the rolling direction of the steel sheet served as an observed section, the observed section was polished and Nital-etched, 10 visual fields (470 μm²/visual field) in a range of ⅛ to ⅜ of the sheet thickness (⅛ thickness to ⅜ thickness) from the surface in which the position of a ¼ depth of the steel thickness (¼ thickness) from the surface was centered were observed using a field emission scanning electron microscope (FE-SEM) at a magnification of 5000 times, the area ratios of each structure obtained in the individual visual fields were averaged, and the average value was regarded as the volume percentage of each structure.

In addition, the volume percentage of fresh martensite was obtained as a difference between the volume percentage obtained as the area ratio of a non-corroded region that was observed with the FE-SEM and the volume percentage of residual austenite measured by X-ray diffraction.

The volume percentages of each phase are shown in Table 2-3.

The tensile strength was obtained by carrying out a tensile test according to the regulation of JIS Z 2241 (2011) using a JIS No. 5 test piece collected from a ¼ position in the width direction of the hot-rolled steel sheet such that a direction perpendicular to a rolling direction (C direction) became the longitudinal direction.

The results are shown in Table 2-3.

The limit bend was obtained by the following method.

First, as a bending test piece, a 100 mm×30 mm strip-shaped test piece was cut out from a ½ position in the width direction of the hot-rolled steel sheet, and bending workability was investigated according to JIS Z 2248 (V block 90° bending test) for both a bend where the bending ridge is parallel to the rolling direction (L direction) (L-axis bending) and a bend where the bending ridge is parallel to the direction perpendicular to the rolling direction (C direction) (C-axis bending).

At this time, the minimum bend radii at which cracks were not initiated in the outside bend and the inside bend were obtained, and a value obtained by dividing the average value of the minimum bend radii of the L axis and the C axis by the sheet thickness (t=$t_f$) was regarded as the limit bend R/t and used as the index value of bendability. Here, regarding the presence or absence of cracks, a cross section obtained by cutting the test piece after the V block 90° bending test on a surface parallel to the bending direction and perpendicular to the sheet surface was mirror-polished, then, cracks were observed with an optical microscope, and a case where the lengths of cracks observed in any one of the outside bend and the inside bend exceeded 30 μm was determined as cracks being present.

The results are shown in Table 2-3.

In addition, the degree of randomness and the degree of concentration, which are the indexes of the surface properties, and the average pole density of the orientation group 1 and the average pole density of the orientation group 2, which are the indexes of the texture in a range from the surface to 1/10 of the sheet thickness, were obtained by the above-described method.

The results are shown in Table 2-3.

TABLE 1

| Steel kind | Chemical composition (unit: mass %, remainder: Fe and impurities) | | | | | | | | |
|---|---|---|---|---|---|---|---|---|---|
| | C | Si | Mn | sol. Al | P | S | N | O | Others |
| A | 0.16 | 0.50 | 2.20 | 0.050 | 0.010 | 0.001 | 0.003 | 0.005 | |
| B | 0.05 | 1.00 | 2.40 | 0.050 | 0.008 | 0.001 | 0.002 | 0.005 | Ti: 0.02 Nb: 0.02 |
| C | 0.16 | 0.10 | 2.30 | 0.050 | 0.010 | 0.001 | 0.003 | 0.004 | Ti: 0.04 Nb: 0.02 |
| D | 0.26 | 1.30 | 1.30 | 0.030 | 0.009 | 0.001 | 0.003 | 0.005 | B: 0.002 |
| E | 0.26 | 1.80 | 3.00 | 0.050 | 0.010 | 0.001 | 0.002 | 0.005 | V: 0.05 Cr: 0.05 Mo: 0.05 |
| F | 0.16 | 1.00 | 2.20 | 0.100 | 0.011 | 0.001 | 0.003 | 0.005 | Cu: 0.05 Co: 0.05 W: 0.05 |
| G | 0.18 | 0.80 | 2.20 | 0.050 | 0.010 | 0.001 | 0.003 | 0.005 | Ni: 0.05 Ca: 0.005 Mg: 0.005 |
| H | 0.23 | 1.00 | 1.80 | 0.033 | 0.010 | 0.001 | 0.002 | 0.003 | REM: 0.005 Mg: 0.01 Zr: 0.005 |
| I | 0.22 | 1.50 | 2.30 | 0.020 | 0.010 | 0.001 | 0.003 | 0.003 | |
| J | 0.12 | 0.50 | 4.50 | 0.020 | 0.012 | 0.001 | 0.003 | 0.004 | |

TABLE 2-1

| | | | Hot rolling | | | | | | |
|---|---|---|---|---|---|---|---|---|---|
| No. | Steel kind | Product sheet thickness ($t_f$) (mm) | Slab heating temperature (° C.) | Sheet thickness of rough-rolled sheet (mm) | Finish rolling beginning temperature (° C.) | $F_1$ (%) | $F_2$ (%) | FT (%) | Coiling temperature (° C.) |
| 1 | A | 2.5 | 1250 | 40 | 1110 | 15 | 13 | 983 | 550 |
| 2 | A | 2.5 | 1250 | 33 | 1120 | 15 | 13 | 980 | 555 |
| 3 | A | 2.5 | 1250 | 47 | 1110 | 15 | 13 | 975 | 554 |

TABLE 2-1-continued

| | | | | | Hot rolling | | | | |
|---|---|---|---|---|---|---|---|---|---|
| No. | Steel kind | Product sheet thickness ($t_f$) (mm) | Slab heating temperature (° C.) | Sheet thickness of rough-rolled sheet (mm) | Finish rolling beginning temperature (° C.) | $F_1$ (%) | $F_2$ (%) | FT (%) | Coiling temperature (° C.) |
| 4 | A | 2.5 | 1250 | 40 | 1080 | 15 | 13 | 977 | 555 |
| 5 | A | 2.5 | 1250 | 40 | 1120 | 10 | 13 | 983 | 554 |
| 6 | A | 2.5 | 1250 | 40 | 1130 | 25 | 13 | 981 | 549 |
| 7 | A | 2.5 | 1250 | 40 | 1110 | 17 | 10 | 976 | 549 |
| 8 | A | 2.5 | 1250 | 40 | 1120 | 17 | 23 | 982 | 551 |
| 9 | A | 2.5 | 1250 | 40 | 1120 | 17 | 13 | 820 | 556 |
| 10 | A | 2.5 | 1250 | 40 | 1110 | 17 | 13 | 980 | 553 |
| 11 | A | 2.5 | 1250 | 40 | 1120 | 17 | 13 | 980 | 557 |
| 12 | A | 2.5 | 1250 | 40 | 1110 | 15 | 13 | 983 | 550 |
| 13 | A | 2.5 | 1250 | 40 | 1120 | 18 | 13 | 979 | 559 |
| 14 | A | 2.5 | 1250 | 40 | 1110 | 18 | 13 | 981 | 551 |
| 15 | A | 2.5 | 1250 | 40 | 1130 | 18 | 13 | 981 | 559 |
| 16 | A | 2.5 | 1250 | 40 | 1110 | 18 | 13 | 983 | 553 |
| 17 | A | 2.5 | 1250 | 40 | 1110 | 18 | 13 | 983 | 553 |
| 18 | A | 1.6 | 1250 | 36 | 1120 | 15 | 13 | 987 | 556 |
| 19 | A | 1.8 | 1250 | 44 | 1110 | 15 | 13 | 976 | 315 |
| 20 | A | 2.0 | 1300 | 40 | 1120 | 12 | 12 | 982 | 555 |
| 21 | A | 2.2 | 1250 | 40 | 1120 | 21 | 20 | 940 | 630 |
| 22 | A | 2.8 | 1200 | 40 | 1110 | 17 | 13 | 982 | 553 |
| 23 | A | 3.5 | 1250 | 40 | 1110 | 17 | 13 | 983 | 560 |
| 24 | B | 2.2 | 1250 | 40 | 1160 | 17 | 15 | 960 | 600 |
| 25 | C | 2.2 | 1250 | 40 | 1160 | 17 | 15 | 955 | 599 |
| 26 | D | 1.8 | 1250 | 40 | 1120 | 17 | 16 | 958 | 596 |
| 27 | E | 1.8 | 1250 | 40 | 1130 | 18 | 15 | 963 | 615 |
| 28 | F | 1.4 | 1250 | 40 | 1130 | 20 | 20 | 946 | 450 |
| 29 | G | 1.8 | 1250 | 40 | 1130 | 19 | 19 | 973 | 601 |
| 30 | H | 1.8 | 1250 | 40 | 1130 | 18 | 19 | 978 | 597 |
| 31 | I | 1.6 | 1250 | 40 | 1110 | 16 | 13 | 985 | 540 |
| 32 | J | 2.3 | 1250 | 40 | 1110 | 18 | 13 | 983 | 550 |
| 33 | A | 2.2 | 1250 | 40 | 1130 | 20 | 19 | 940 | 630 |

TABLE 2-2

| | Pickling Hydrochloric acid concentration (%) | Rolling | | | | | Thermal treatment | | | |
|---|---|---|---|---|---|---|---|---|---|---|
| No. | | Temperature (° C.) | Number of rolling machines | Number of passes | Rolling reduction (%) | Elapsed time from pickling (s) | Heating temperature (° C.) | Retention time (s) | Pattern | Plating Kind |
| 1 | 5 | 70 | 1 | 1 | 5.0 | 30 | 804 | 120 | DP | Not plating |
| 2 | 5 | 70 | 1 | 1 | 5.0 | 30 | 804 | 120 | DP | Not plating |
| 3 | 5 | 75 | 1 | 1 | 5.0 | 30 | 805 | 120 | DP | Not plating |
| 4 | 5 | 75 | 1 | 1 | 5.0 | 30 | 806 | 120 | DP | Not plating |
| 5 | 5 | 70 | 1 | 1 | 5.0 | 30 | 803 | 120 | DP | Not plating |
| 6 | 5 | 65 | 1 | 1 | 5.0 | 30 | 802 | 120 | DP | Not plating |
| 7 | 5 | 65 | 1 | 1 | 5.0 | 30 | 803 | 120 | DP | Not plating |
| 8 | 5 | 70 | 1 | 1 | 5.0 | 30 | 803 | 120 | DP | Not plating |
| 9 | 5 | 70 | 1 | 1 | 5.0 | 30 | 805 | 120 | DP | Not plating |
| 10 | 5 | 45 | 1 | 1 | 5.0 | 30 | 806 | 120 | DP | Not plating |
| 11 | 5 | 105 | 1 | 1 | 5.0 | 30 | 802 | 120 | DP | Not plating |
| 12 | 5 | 70 | 2 | 2 | 5.0 | 30 | 803 | 120 | DP | Not plating |
| 13 | 5 | 85 | 1 | 1 | 0.5 | 30 | 804 | 120 | DP | Not plating |
| 14 | 5 | 85 | 1 | 1 | 23.0 | 30 | 806 | 120 | DP | Not plating |
| 15 | 5 | 70 | 1 | 1 | 5.0 | 350 | 804 | 120 | DP | Not plating |
| 16 | 5 | 85 | 1 | 1 | 5.0 | 30 | 702 | 120 | DP | Not plating |
| 17 | 5 | 70 | 1 | 1 | 5.0 | 30 | 780 | 5 | DP | Not plating |
| 18 | 5 | 70 | 1 | 1 | 5.0 | 30 | 810 | 120 | DP | Not plating |
| 19 | 5 | 75 | 1 | 1 | 5.0 | 30 | 880 | 120 | DP | GA |
| 20 | 5 | 70 | 1 | 1 | 5.0 | 30 | 800 | 120 | DP | GI |
| 21 | 5 | 70 | 1 | 1 | 5.0 | 30 | 799 | 120 | DP | GA |
| 22 | 8 | 60 | 1 | 1 | 17.0 | 30 | 804 | 120 | DP | Not plating |
| 23 | 4 | 90 | 1 | 1 | 3.0 | 270 | 803 | 120 | DP | Not plating |
| 24 | 5 | 75 | 1 | 1 | 5.0 | 60 | 820 | 300 | DP | Not plating |
| 25 | 5 | 75 | 1 | 1 | 5.0 | 90 | 811 | 300 | DP | GA |
| 26 | 5 | 75 | 1 | 1 | 5.0 | 180 | 805 | 300 | TRIP | Not plating |
| 27 | 4 | 80 | 1 | 1 | 7.0 | 50 | 830 | 300 | t-M | Not plating |
| 28 | 4 | 80 | 1 | 1 | 15.0 | 50 | 815 | 300 | TRIP | Not plating |
| 29 | 4 | 65 | 1 | 1 | 8.0 | 50 | 800 | 300 | DP | Not plating |

TABLE 2-2-continued

| No. | Pickling Hydrochloric acid concentration (%) | Rolling Temperature (° C.) | Number of rolling machines | Number of passes | Rolling reduction (%) | Elapsed time from pickling (s) | Thermal treatment Heating temperature (° C.) | Retention time (s) | Pattern | Plating Kind |
|---|---|---|---|---|---|---|---|---|---|---|
| 30 | 4 | 70 | 1 | 1 | 8.0 | 50 | 799 | 300 | t-M | Not plating |
| 31 | 5 | 70 | 1 | 1 | 5.0 | 30 | 790 | 120 | TRIP | Not plating |
| 32 | 5 | 70 | 1 | 1 | 5.0 | 30 | 815 | 120 | DP | Not plating |
| 33 | 5 | 60 | 1 | 1 | 0.8 | 150 | 800 | 120 | DP | Not plating |

TABLE 2-3

| No. | Microstructure (volume %) α | P | FM | t-M + B | Retained γ | Texture Average pole density of orientation group 1 | Average pole density of orientation group 2 | Surface properties S value | E value | Mechanical properties Tensile strength TS (MPa) | Limit bend R/t | Note |
|---|---|---|---|---|---|---|---|---|---|---|---|---|
| 1 | 62.6 | 0.0 | 1.4 | 35.5 | 0.5 | 0.8 | 3.0 | 6.5 | 0.05 | 989 | 0.8 | Invention Example |
| 2 | 54.0 | 0.0 | 6.3 | 39.2 | 0.5 | 1.7 | 1.2 | 6.3 | 0.06 | 990 | 2.2 | Comparative Example |
| 3 | 58.4 | 0.0 | 3.0 | 37.9 | 0.7 | 1.6 | 1.3 | 6.4 | 0.05 | 982 | 2.1 | Comparative Example |
| 4 | 59.1 | 0.0 | 2.5 | 38.0 | 0.4 | 1.8 | 1.1 | 8.5 | 0.03 | 987 | 2.7 | Comparative Example |
| 5 | 61.8 | 0.0 | 1.4 | 36.3 | 0.5 | 1.7 | 1.3 | 6.5 | 0.05 | 988 | 2.2 | Comparative Example |
| 6 | 58.6 | 0.0 | 4.6 | 36.3 | 0.5 | 1.4 | 1.3 | 6.4 | 0.07 | 981 | 2.2 | Comparative Example |
| 7 | 57.9 | 0.0 | 2.7 | 38.8 | 0.5 | 1.6 | 1.6 | 6.5 | 0.05 | 984 | 2.1 | Comparative Example |
| 8 | 59.3 | 0.0 | 4.2 | 36.0 | 0.5 | 1.7 | 1.2 | 6.4 | 0.06 | 982 | 2.2 | Comparative Example |
| 9 | 56.7 | 0.0 | 2.4 | 40.5 | 0.5 | 1.8 | 1.4 | 6.5 | 0.05 | 989 | 2.4 | Comparative Example |
| 10 | 56.5 | 0.0 | 4.1 | 38.9 | 0.5 | 0.8 | 3.0 | 8.0 | 0.05 | 980 | 2.3 | Comparative Example |
| 11 | 60.7 | 0.0 | 1.5 | 37.3 | 0.5 | 1.4 | 1.3 | 6.6 | 0.05 | 985 | 2.2 | Comparative Example |
| 12 | 58.2 | 0.0 | 1.9 | 39.4 | 0.5 | 2.0 | 1.6 | 6.4 | 0.05 | 987 | 2.2 | Comparative Example |
| 13 | 60.9 | 0.0 | 1.3 | 37.3 | 0.5 | 0.9 | 3.1 | 8.9 | 0.02 | 980 | 2.4 | Comparative Example |
| 14 | 58.8 | 0.0 | 3.6 | 37.2 | 0.5 | 2.1 | 1.3 | 6.4 | 0.05 | 982 | 2.3 | Comparative Example |
| 15 | 58.4 | 0.0 | 3.2 | 37.9 | 0.5 | 1.0 | 3.0 | 6.4 | 0.02 | 984 | 2.4 | Comparative Example |
| 16 | 95.0 | 0.0 | 0.0 | 5.0 | 0.0 | 0.7 | 3.3 | 6.6 | 0.05 | 565 | 0.6 | Comparative Example |
| 17 | 88.0 | 0.0 | 0.0 | 12.0 | 0.0 | 0.8 | 3.4 | 6.6 | 0.06 | 575 | 0.6 | Comparative Example |
| 18 | 56.3 | 0.0 | 5.1 | 38.1 | 0.5 | 1.0 | 2.3 | 6.3 | 0.06 | 999 | 1.4 | Invention Example |
| 19 | 8.1 | 0.0 | 3.2 | 88.0 | 0.7 | 1.1 | 2.4 | 6.2 | 0.05 | 1077 | 1.6 | Invention Example |
| 20 | 62.1 | 0.0 | 1.2 | 36.2 | 0.5 | 1.2 | 2.1 | 6.5 | 0.06 | 991 | 1.4 | Invention Example |
| 21 | 62.0 | 0.0 | 1.3 | 36.2 | 0.5 | 1.4 | 1.7 | 6.4 | 0.06 | 986 | 1.8 | Invention Example |
| 22 | 58.4 | 0.0 | 3.5 | 37.6 | 0.5 | 1.3 | 1.8 | 7.3 | 0.05 | 981 | 1.7 | Invention Example |
| 23 | 59.3 | 0.0 | 2.3 | 37.9 | 0.5 | 1.3 | 1.7 | 7.2 | 0.05 | 985 | 1.8 | Invention Example |
| 24 | 56.9 | 0.0 | 13.0 | 30.0 | 0.1 | 0.9 | 2.9 | 6.3 | 0.06 | 610 | 0.8 | Invention Example |
| 25 | 44.9 | 0.0 | 14.0 | 41.0 | 0.1 | 0.7 | 2.9 | 6.1 | 0.06 | 760 | 0.9 | Invention Example |
| 26 | 30.0 | 0.0 | 14.0 | 41.0 | 15.0 | 0.9 | 3.1 | 6.4 | 0.06 | 1050 | 0.9 | Invention Example |
| 27 | 5.9 | 0.0 | 3.0 | 91.0 | 0.1 | 0.8 | 3.1 | 6.9 | 0.06 | 1480 | 0.9 | Invention Example |
| 28 | 17.0 | 0.0 | 3.0 | 73.0 | 7.0 | 0.8 | 2.9 | 6.7 | 0.06 | 889 | 0.8 | Invention Example |
| 29 | 41.4 | 0.0 | 3.0 | 55.0 | 0.6 | 1.0 | 3.1 | 6.7 | 0.06 | 999 | 0.8 | Invention Example |
| 30 | 7.4 | 0.0 | 3.0 | 89.0 | 0.6 | 0.9 | 2.7 | 6.4 | 0.05 | 1333 | 0.9 | Invention Example |
| 31 | 40.6 | 0.0 | 1.4 | 45.0 | 13.0 | 0.7 | 3.1 | 6.4 | 0.05 | 983 | 0.8 | Invention Example |
| 32 | 57.0 | 0.0 | 1.4 | 41.1 | 0.5 | 0.8 | 3.0 | 6.4 | 0.05 | 1032 | 2.1 | Comparative Example |
| 33 | 61.7 | 0.0 | 1.5 | 36.2 | 0.6 | 1.3 | 1.8 | 7.9 | 0.03 | 988 | 2.2 | Comparative Example |

As is clear from Table 1 and Table 2-1 to Table 2-3, in Nos. 1 and 18 to 31, which were the invention examples, the chemical compositions, the textures and the surface properties were within the scope of the present invention, and not only the tensile strength but also the bending properties were exceptional.

In contrast, in the comparative examples, one or more of the chemical compositions, the textures and the surface properties were not preferable, and the bending properties were poor or the tensile strength was low.

INDUSTRIAL APPLICABILITY

According to the present invention, it is possible to obtain a high-strength steel sheet that has a tensile strength of 590 MPa or more, is capable of suppressing outside bend cracking and inside bend cracking and has exceptional bending workability. Such a steel sheet contributes not only to the weight reduction of vehicle bodies of vehicles but also to the securement of collision safety.

The invention claimed is:
1. A high-strength steel sheet comprising, as chemical components, by mass %:
C: 0.03% to 0.28%;
Si: 0.05% to 2.50%;
Mn: 1.00% to 4.00%;
sol. Al: 0.001% to 2.000%;
P: 0.100% or less;
S: 0.020% or less;

N: 0.010% or less;
O: 0.010% or less;
Ti: 0% to 0.10%;
Nb: 0% to 0.10%;
B: 0% to 0.010%;
V: 0% to 1.00%;
Cr: 0% to 1.00%;
Mo: 0% to 1.00%;
Cu: 0% to 1.00%;
Co: 0% to 1.00%;
W: 0% to 1.00%;
Ni: 0% to 1.00%;
Ca: 0% b to 0.010%;
Mg: 0% to 0.010%;
REM: 0% to 0.010%;
Zr: 0% to 0.010%; and
a remainder: Fe and impurities,
wherein, in a range from a surface to 1/10 of a sheet thickness in a sheet thickness direction, an average pole density of an orientation group 1 that is an orientation group expressed by $\phi1=0°$ to 90°, $\Phi=50°$ to 60° and $\phi2=45°$ in terms of an Euler angle is 1.5 or less, an average pole density of an orientation group 2 that is an orientation group expressed by $\phi1=45°$ to 85°, $\Phi=85°$ to 90° and $\phi2=45°$ in terms of the Euler angle is 1.5 or more, an S value that indicates a degree of randomness of surface properties is 7.5 or less, an E value that indicates a degree of concentration of the surface properties is 0.04 or more, and a tensile strength is 590 MPa or more.

2. The high-strength steel sheet according to claim 1, comprising:

a hot-dip galvanized layer on the surface.

3. The high-strength steel sheet according to claim 2, wherein the hot-dip galvanized layer is a hot-dip galvannealed layer.

* * * * *